United States Patent
Hsieh

(10) Patent No.: US 8,176,631 B2
(45) Date of Patent: May 15, 2012

(54) METHOD FOR MAKING POSITIONING STRUCTURES OF A BICYCLE HUB

(75) Inventor: Te-Yao Hsieh, Daya Township, Taichung County (TW)

(73) Assignee: Bitex Industrial Co., Ltd., Taichung County (TW)

(*) Notice: Subject to any disclaimer, the term of this patent is extended or adjusted under 35 U.S.C. 154(b) by 466 days.

(21) Appl. No.: 12/509,436

(22) Filed: Jul. 24, 2009

(65) Prior Publication Data

US 2009/0282683 A1 Nov. 19, 2009

Related U.S. Application Data

(62) Division of application No. 11/757,993, filed on Jun. 4, 2007, now abandoned.

(51) Int. Cl.
*B21D 53/26* (2006.01)
*B21K 1/40* (2006.01)

(52) U.S. Cl. .............. 29/894.362; 29/894; 29/894.3; 29/894.33; 29/894.34; 29/894.35; 29/894.353; 301/5.7; 301/110.5; 384/545

(58) Field of Classification Search ............ 29/894, 29/894.3, 894.362, 894.33, 894.34, 894.35, 29/894.353, 894.36, 898.07, 898.09; 301/5.7, 301/110.5; 384/545
See application file for complete search history.

(56) References Cited

U.S. PATENT DOCUMENTS

| | | | | |
|---|---|---|---|---|
| 5,063,664 A | * | 11/1991 | Huang | 29/894.361 |
| 5,456,537 A | * | 10/1995 | Wang | 384/545 |
| 5,553,950 A | * | 9/1996 | Pawsat et al. | 384/545 |

* cited by examiner

*Primary Examiner* — Richard Chang

(57) ABSTRACT

A method for making positioning structures of a bicycle hub comprises the steps of: A. bicycle hub clamping step; B. bicycle hub press forming step; and C. bicycle hub loading step. By such arrangements, the positioning structures of the bicycle hub can be obtained by the quick press forming without affecting the structure strength.

3 Claims, 8 Drawing Sheets

METHOD FOR MAKING POSITIONING STRUCTURES OF A BICYCLE HUB

This application is a divisional application of U.S. patent application Ser. No. 11/757,993, which claims the benefit of the earlier filing date of Jun. 4, 2007 now abandoned. Claims 1-3 of this application correspond to claims 5-7 of the U.S. patent application Ser. No. 11/757,993, respectively.

BACKGROUND OF THE INVENTION

1. Field of the Invention

The present invention relates to a bicycle hub, and more particularly to a method for making positioning structures of a bicycle hub.

2. Description of the Prior Art

Bicycle is a traffic tool for leisure sport and racing, which is not only environmental friendly, but also can provide exercise for the rider. The bicycle hub is an important component for connecting the bicycle frame and the wheel. As shown in FIG. 1, the bicycle hub 10 comprises a hollow cylindrical hub shell 11. Each end of the hub shell 11 is formed with a ring-shaped fixing piece 12 in the radial direction, and one side of each of the fixing piece is formed with a circular flange 13. Under the original thickness, the inner wall of the flange 13 is cut thin to form a positioning structure 14. A bearing A is embedded in each of the two flanges 13 and is positioned by the positioning structure 14. However, this conventional bicycle hub still has the following problems:

1. After the flange 13 of the bicycle hub 10 is cut thin, it will damage the structure strength of the original flange 13, but this bicycle hub 10 will not only be subjected to a heavy load but to a high speed rotation, therefore, the flange 13 will definitely be deformed after a long-term of use. Moreover, if the bicycle hub 10 breaks during a high speed ride, it will severely affect the riding safety. The bicycle can be bought after destroyed, but the life safety can not be neglected;

2. The positioning structure 14 is formed by cutting the flange 13 of the bicycle hub 10, in order to accurately control the thickness during the cutting process, the machining speed must be affected and the machining time must be prolonged, thus causing the waste of the cost.

The present invention has arisen to mitigate and/or obviate the afore-described disadvantages.

SUMMARY OF THE INVENTION

The primary objective of the present invention is to provide a method for making positioning structures of a bicycle hub which can make positioning structures for a bicycle hub by a quick press forming process without affecting structure strength.

In order to achieve the abovementioned objective, the method for making positioning structures of a bicycle hub in accordance with the present invention comprises the following steps: A. bicycle hub clamping step: clamping an outer surface of the bicycle hub by a positioning machine firstly; B. bicycle hub press forming step: after the outer surface of the hub shell is clamped by the positioning machine, axially pressing the inner surface of each receiving portion with the punch by using points as targets, so as to form at least three positioning structures on the receiving portion that are shaped correspondingly to the punching ribs of the punch; and C. bicycle hub loading step: after the inner surface of each receiving portion is pressed by the punch to form at least three positioning structures, placing a bearing in each receiving portion of the bicycle hub, and the bearing is positioned by the receiving portion.

With the above making method, the present invention can achieve the following objectives:

1. The press forming process of the positioning structures of the bicycle hub is performed by using points as the punching and pressing targets without influencing the structure strength of the receiving portion, so that the receiving portion of the bicycle hub is strong enough to load the weight, and the rider can ride safely without worrying about the ruin of the bicycle hub.

2. The method for making positioning structures of a bicycle hub makes the positioning structure by quick press forming, so that the machining speed is increased and the machining time is shortened, thus saving the manpower cost and the machining cost.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
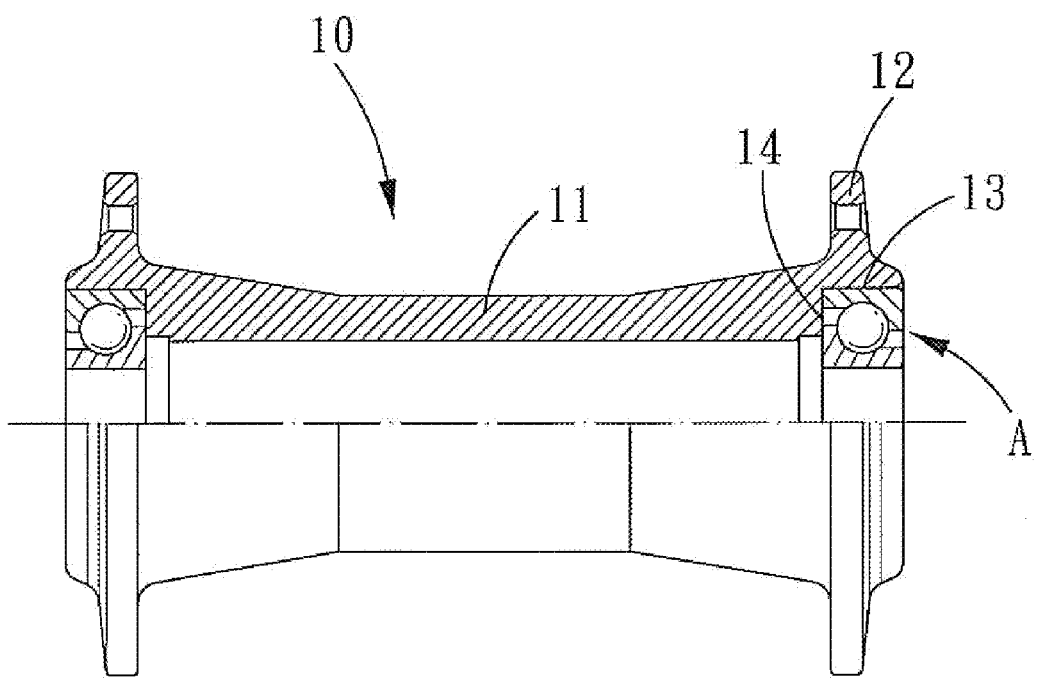
FIG. 1 is a perspective view of a conventional bicycle hub.
Figure 2:
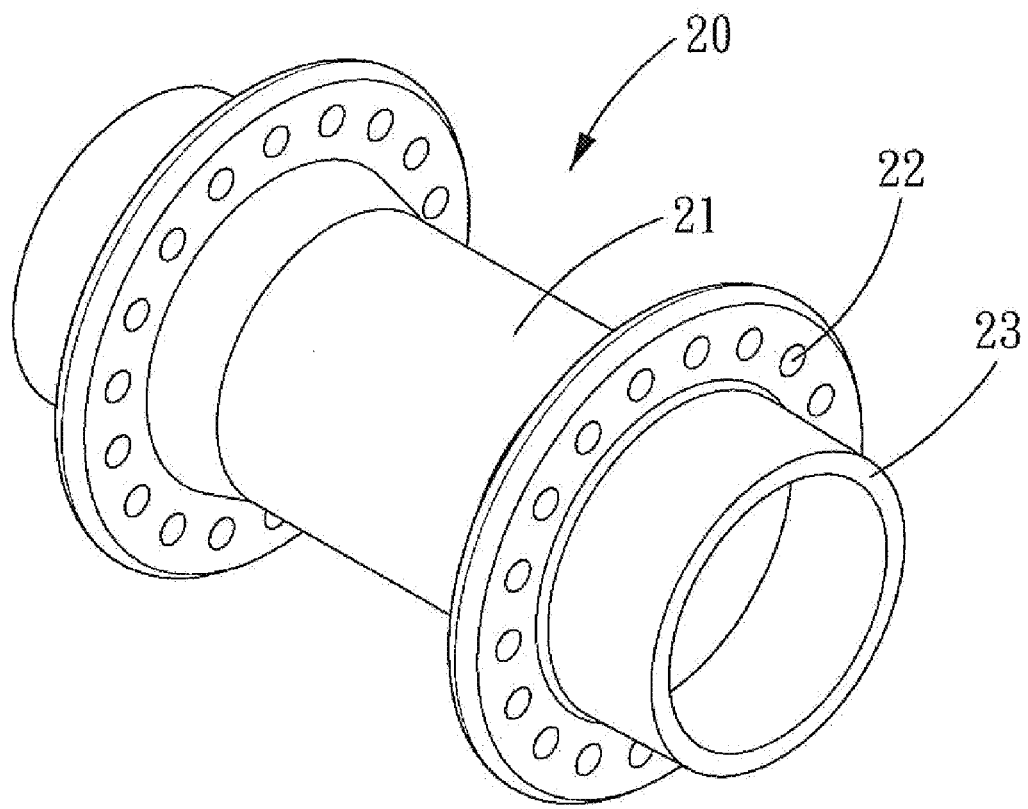
FIG. 2 is a perspective view of a bicycle hub in accordance with the prevent invention.

Referring to FIGS. 2-7, a bicycle hub 20 (as shown in FIG. 2) in accordance with the present invention comprises a hollow cylindrical hub shell 21. Each end of the hub shell 21 is radially formed with a ring-shaped fixing portion 22. The fixing portion 22 is provided for the insertion of the spokes of the bicycle wheel to support the weight of the bicycle frame. One side of each of the fixing portions 22 is axially formed with a hollow cylindrical receiving portion 23.

Figure 3:
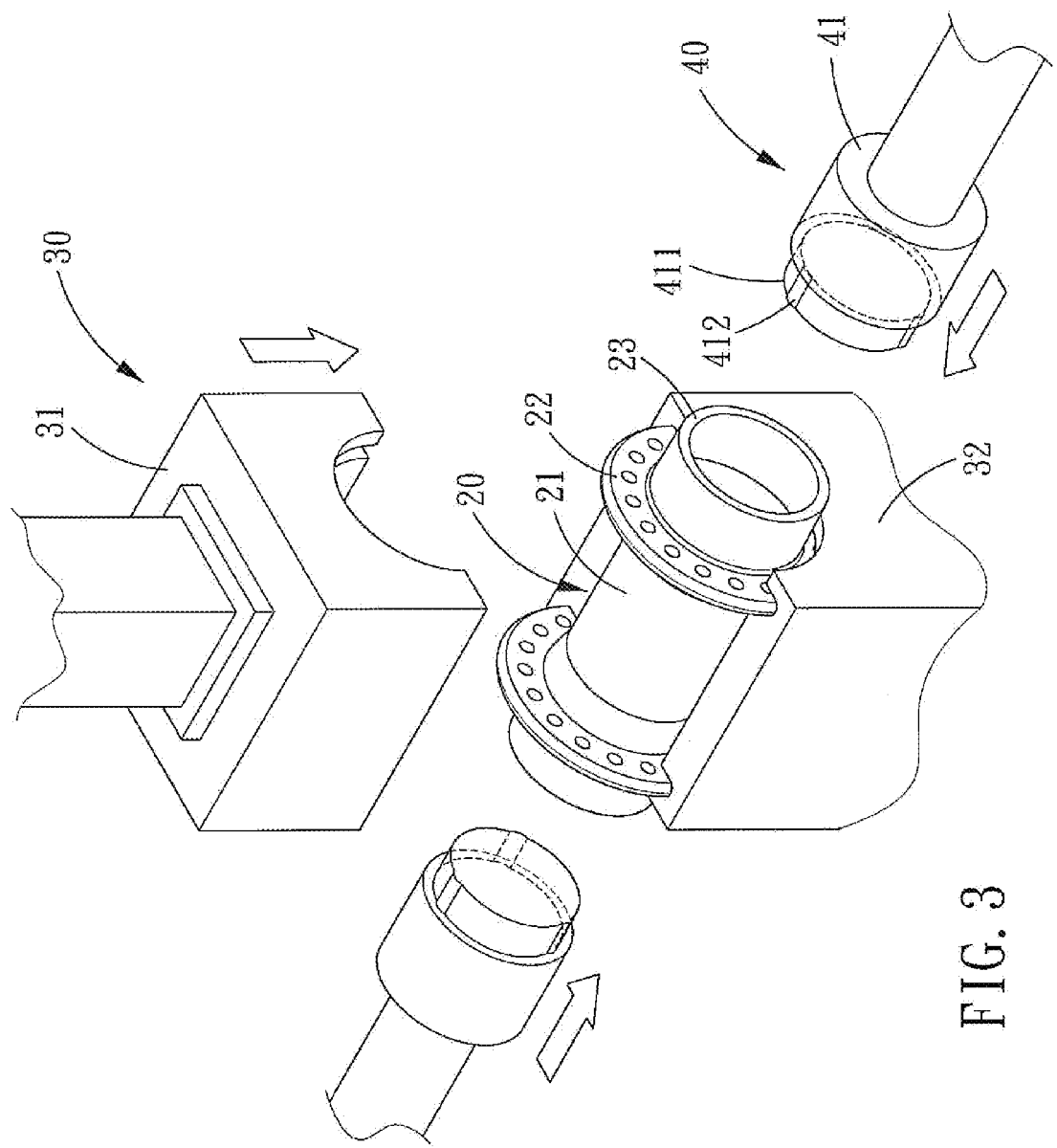
FIG. 3 shows that the bicycle hub is prepared to operate in accordance with the prevent invention.

The bicycle hub 20 is pressed by a positioning machine 30 and a punch 40 to form positioning structures 24. The positioning machine 30 (as shown in FIG. 3) includes an upper clamping arm 31 and a lower clamping arm 32 for clamping the outer surface of the bicycle hub 20. The punch 40 includes a punching member 41, and one end of the punching member 41 is formed with a punching head 411. The shape of the punching head 411 corresponds to the shape of the receiving portion 23 of the bicycle hub 20. On the periphery of the punching head 411 are formed at least three annularly-arranged parallel punching ribs 412 to be engaged in the inner surface of the receiving portion 23 of the bicycle hub 20.

Figure 4:
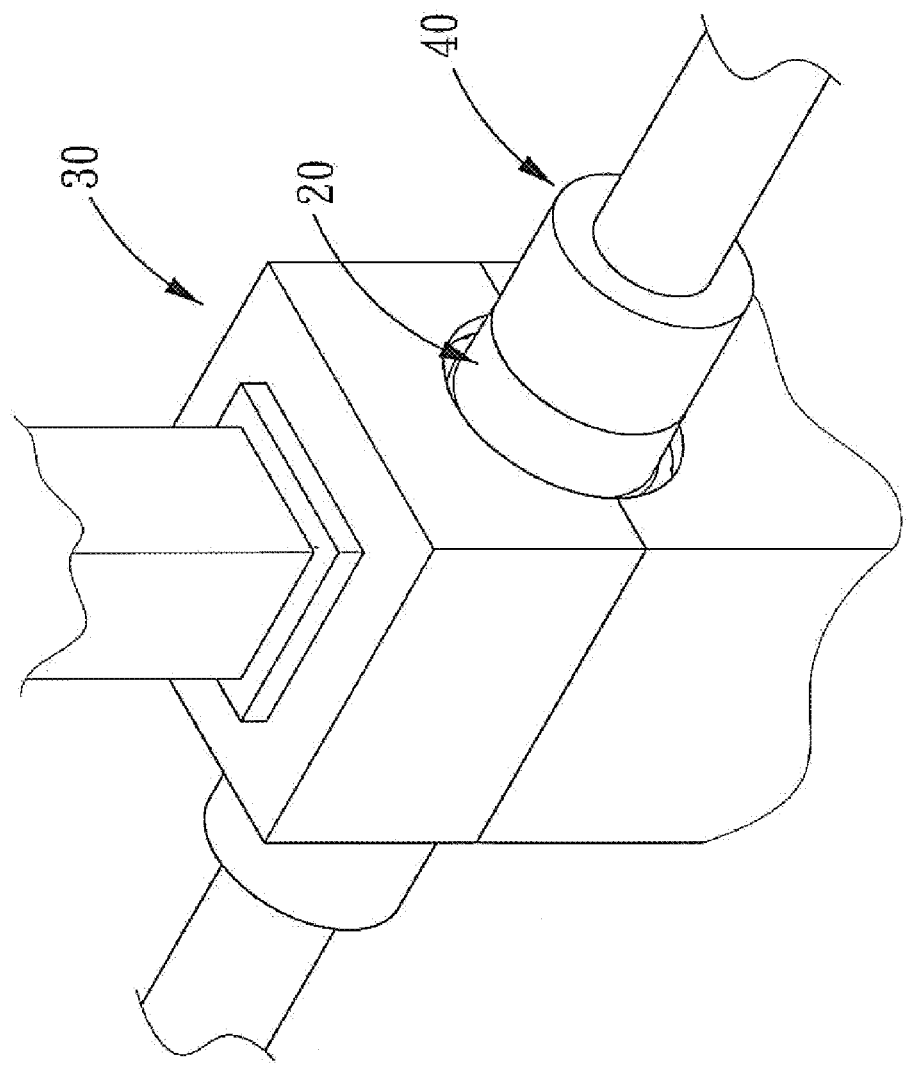
FIG. 4 shows a press forming operation of the bicycle hub in accordance with the prevent invention.
Figure 5:
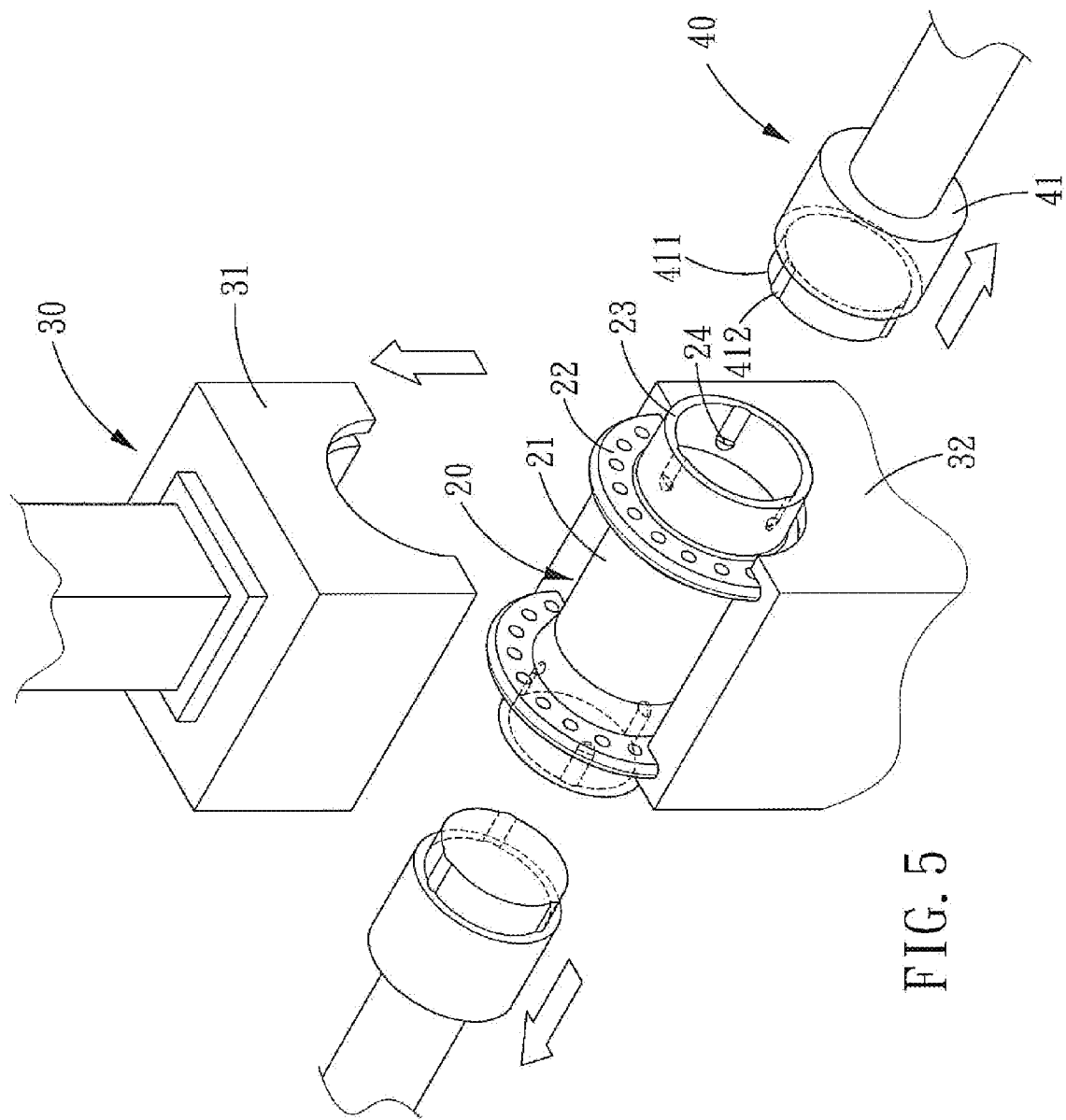
FIG. 5 shows the bicycle hub has finished the press forming operation in accordance with the prevent invention.
Figure 6:
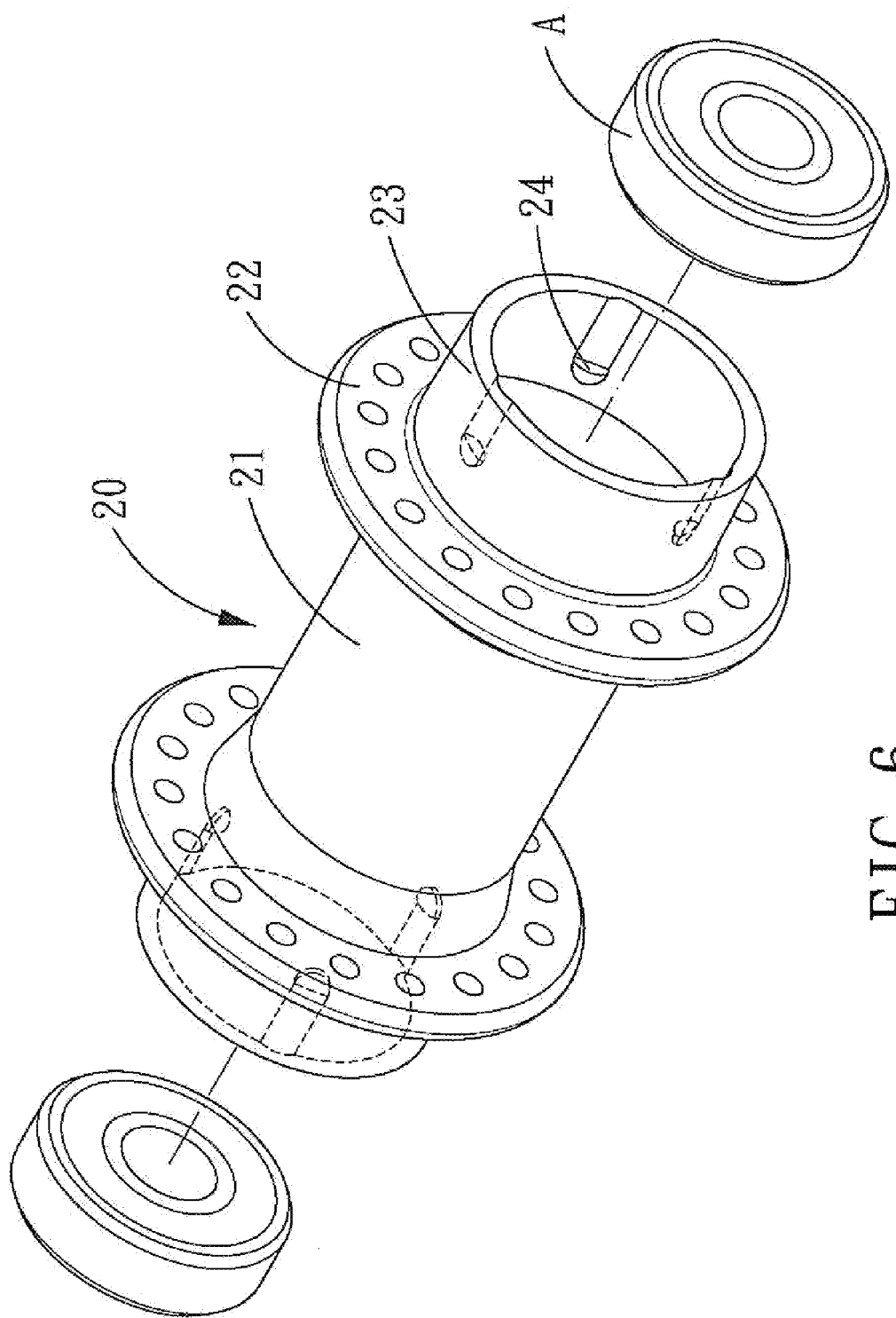
FIG. 6 shows the loading operation of the bicycle hub in accordance with the prevent invention.
Figure 7:
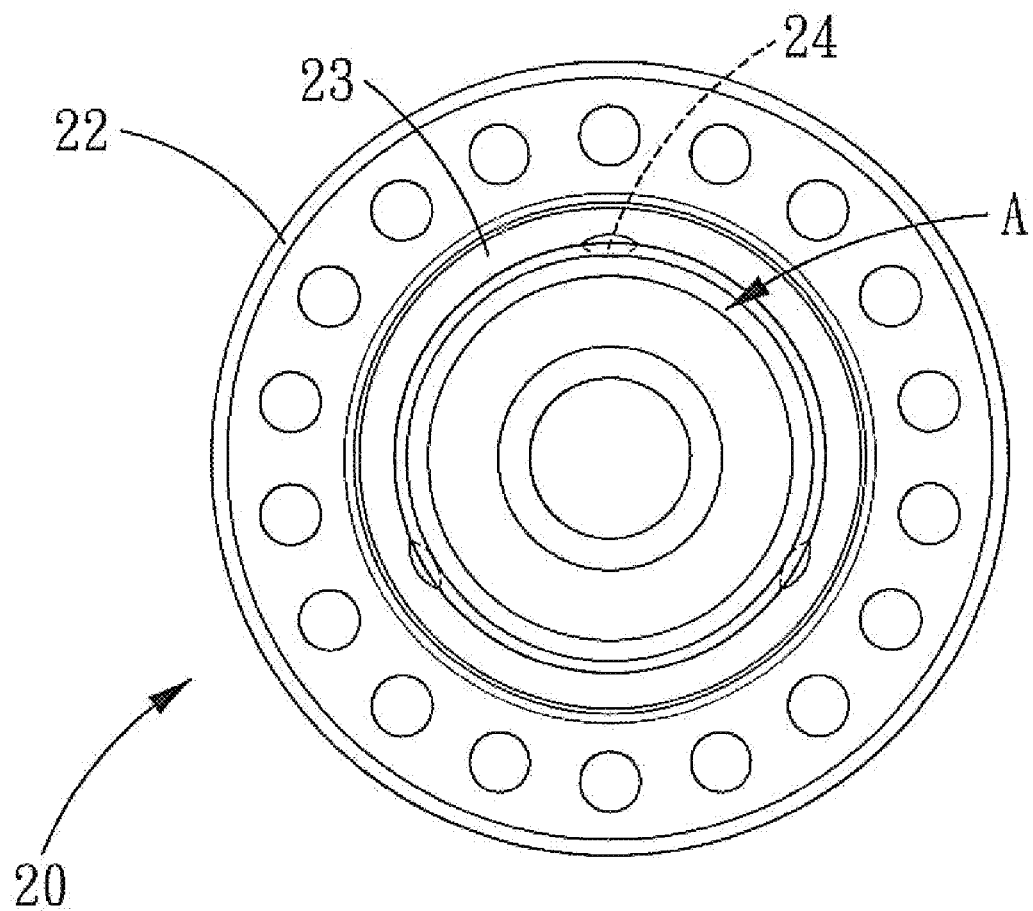
FIG. 7 is a cross sectional view showing the loading operation of the bicycle hub in accordance with the prevent invention.
Figure 8:
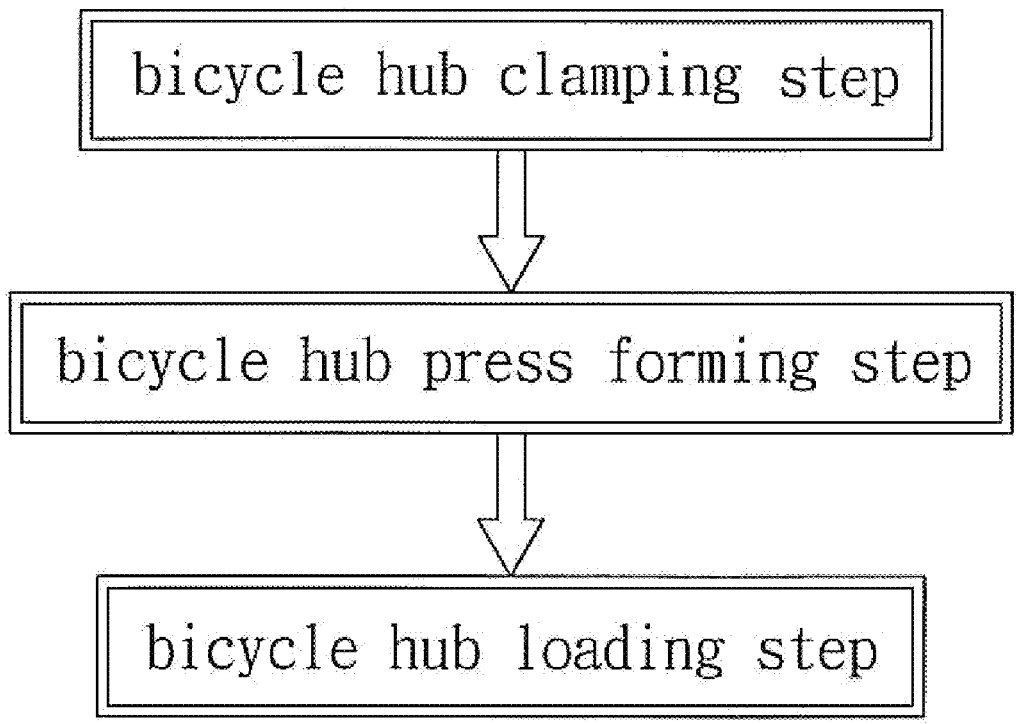
FIG. 8 is a flow chart in accordance with the prevent invention.

The receiving portion 23 of the bicycle hub 20 (as shown in FIG. 4) is processed under its original thickness. The punch 40 utilizes the punching head 411 of the punching member 41 to punch the inner surface of the receiving portion 23 by inserting it into the open end of the receiving portion 23, so as to form at least three positioning structures 24 on each receiving portion 23 of the bicycle hub 20 that are shaped correspondingly to the punching ribs 412 of the punching head 411 (as shown in FIG. 5). The positioning structures 24 are semi-circular flanges located at the same level and used to retain the bearing A (as shown in FIGS. 6 and 7).

Referring to FIGS. 2-8, a method for making positioning structures of a bicycle hub in accordance with present invention utilizes the positioning machine 30 and the punch 40 to form the positioning structures 24 on the bicycle hub 20 and comprises the following steps:

A. bicycle hub clamping step: clamping the outer surface of the hub shell 21 of the bicycle hub 20 with the upper clamping arm 31 and the lower clamping arm 32;

B. bicycle hub press forming step: pressing the inner surface of the receiving portion 23 with the punching head 411 of the punching member 41 of the punch 40 by inserting the punching head 411 of the punching member 41 into the open end of the receiving portion 23, so as to form at least three positioning structures 24 on each receiving portion 23 of the bicycle hub 20 that are shaped correspondingly to the punching ribs 412 of the punching head 411, after the outer surface of the hub shell 21 of the bicycle hub 20 is clamped by the positioning machine 30; and C. bicycle hub loading step: placing the bearing A in the receiving portion 23 of the bicycle hub 20, after the three positioning structures 24 are formed by the punch 40, the bearing A is positioned by the positioning structures 24 of the receiving portion 23.

The following objectives can be achieved by analyzing the above-mentioned steps:

1. The press forming process of the positioning structures 24 of the bicycle hub 20 is performed by using points as the punching and pressing targets without influencing the structure strength of the receiving portion 23, so that the receiving portion 23 of the bicycle hub 20 is strong enough to load the weight, and the rider can ride safely without worrying about the ruin of the bicycle hub.

2. The method for making positioning structures of a bicycle hub makes the positioning structures 24 by quick press forming, so that the machining speed is increased and the machining time is shortened, thus saving the manpower cost and the machining cost.

To summarize, the present invention relates to a method for making positioning structures of a bicycle hub. The method for making positioning structures of a bicycle hub comprises the following steps: A. bicycle hub clamping step; B. bicycle hub press forming step; and C. bicycle hub loading step. By such arrangements, the positioning structures of the bicycle hub can be obtained by the quick press forming without affecting the structure strength.

While we have shown and described various embodiments in accordance with the present invention, it is clear to those skilled in the art that further embodiments may be made without departing from the scope of the present invention.

What is claimed is:

1. A method for making positioning structures of a bicycle hub comprising the steps of:
   bicycle hub clamping step: clamping an outer surface of the bicycle hub by a positioning machine firstly;
   bicycle hub press forming step: after the bicycle hub is clamped by the positioning machine, axially pressing a receiving portion which is axially formed at each end of the bicycle hub with a punch to form at least three positioning structures shaped correspondingly to three ribs of the punch, and when the pressing of the punch onto the receiving portion is carried out, the punch is in contact with the receiving portion in a point-to-point manner; and
   bicycle hub loading step: after the inner surface of each of the receiving portions is pressed by the punch to form at least the three positioning structures, placing a bearing in each of the receiving portions of the bicycle hub, and the bearing is positioned by the receiving portions.

2. The method for making positioning structures of a bicycle hub as claimed in claim 1, wherein the positioning machine of the bicycle hub clamping step includes an upper clamping arm and a lower clamping arm, and the bicycle hub is clamped by the upper clamping arm and the lower clamping arm.

3. The method for making positioning structures of a bicycle hub as claimed in claim 2, wherein the punch includes a punching member, one end of the punching member is formed with a punching head, and on a periphery of the punching head are formed at least three annularly-arranged parallel punching ribs, the punch utilizes the punching head of the punching member to punch the inner surface of each of the receiving portions by inserting the punch into the one end of each of the receiving portions, so as to form at least three positioning structures on each of the receiving portions of the bicycle hub that are shaped correspondingly to the punching ribs of the punching head.

* * * * *